(12) United States Patent
Axtell et al.

(10) Patent No.: US 8,249,396 B2
(45) Date of Patent: Aug. 21, 2012

(54) SYSTEM AND METHODS FOR HANDLING FINANCIAL DOCUMENT RETURNS AND PROCESSING EXCEPTIONS

(75) Inventors: Bethany M. Axtell, Ravena, NY (US); Patricia A. S. Fleming, Brea, CA (US); Douglas P. McKinley, Charlotte, NC (US); Sharon M. Morris, Dallas, TX (US); Martin Mulligan, Gloversville, NY (US); Leslie M. Overholser, Severna Park, MD (US); L. Edward Shaw, Dallas, TX (US); Gerald M. Vye, Castleton, NY (US); Brian K. Walter, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 968 days.

(21) Appl. No.: 11/532,578

(22) Filed: Sep. 18, 2006

(65) Prior Publication Data
US 2008/0069481 A1    Mar. 20, 2008

(51) Int. Cl.
*G06K 9/60* (2006.01)
*G06F 7/00* (2006.01)
*G06F 17/00* (2006.01)

(52) U.S. Cl. .................................. 382/305; 707/694
(58) Field of Classification Search ................. 382/305, 382/306
See application file for complete search history.

(56) References Cited

U.S. PATENT DOCUMENTS

| | | | |
|---|---|---|---|
| 5,691,524 A * | 11/1997 | Josephson ........................ 705/40 |
| 6,301,379 B1 * | 10/2001 | Thompson et al. ........... 382/137 |
| 2002/0165007 A1 | 11/2002 | Gawne |
| 2003/0009492 A1 | 1/2003 | Gawne |
| 2004/0117280 A1 | 6/2004 | Klee et al. |
| 2005/0071283 A1 * | 3/2005 | Randle et al. ................... 705/75 |
| 2005/0097019 A1 | 5/2005 | Jacobs |
| 2005/0160039 A1 | 7/2005 | Garner, IV et al. |
| 2005/0171899 A1 | 8/2005 | Dunn et al. |

FOREIGN PATENT DOCUMENTS

EP     0671696 A1    9/1995
(Continued)

OTHER PUBLICATIONS

Bank of America Corporation, PCT International Search Report, issued in corresponding International Patent Application No. PCT/US07/78766, Oct. 1, 2008.

(Continued)

*Primary Examiner* — Alex Liew
(74) *Attorney, Agent, or Firm* — Michael A. Springs; Moore & Van Allen, PLLC; Padowithz Alce

(57) ABSTRACT

A system and methods for handling financial document returns and processing exceptions are disclosed. Embodiments of the invention provide a returns and exceptions platform to image-enable check returns and exceptions within a financial institution. This capability can be in part enabled by a system that provides both for decisioning based on images, and dispatching or exporting images and data in a plurality of formats from the system into which they are first loaded, so that paper items need not be referenced again. The plurality of formats for export can include X9.37i files, external and internal cash letters, and image replacement documents. The image-based processes of the invention can be implemented by a plurality of application servers and a plurality of database servers interconnected by a network.

27 Claims, 8 Drawing Sheets

FOREIGN PATENT DOCUMENTS

| WO | WO 01/84436 A2 | 11/2001 |
| WO | WO 03/060797 A1 | 7/2003 |
| WO | WO 2005/066880 A1 | 7/2005 |

OTHER PUBLICATIONS

Bank of America Corporation, PCT International Written Opinion, issued in corresponding International Patent Application No. PCT/US07/78766, Oct. 1, 2008.

Bank of America Corporation, PCT International Preliminary Report on Patentability, issued in corresponding International Patent Application No. PCT/US2007/078766, Apr. 2, 2009.

Extended European Search Report dated Jan. 21, 2011 for European Patent Application No. EP 07842687.1.

Examination Report for European Patent Application No. 07842687.1 mailed Jan. 25, 2012.

* cited by examiner

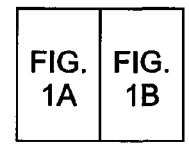
FIG. 1B
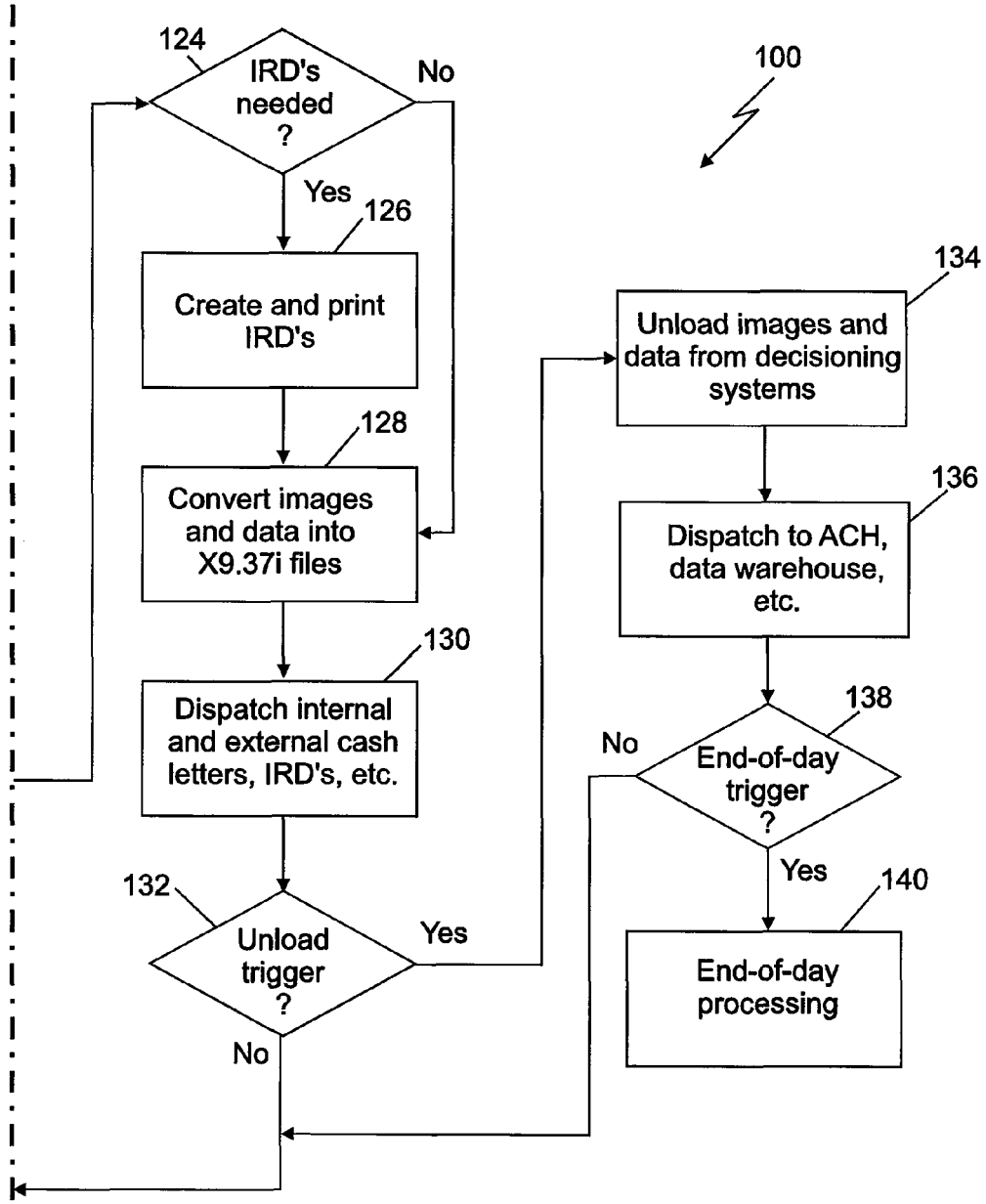

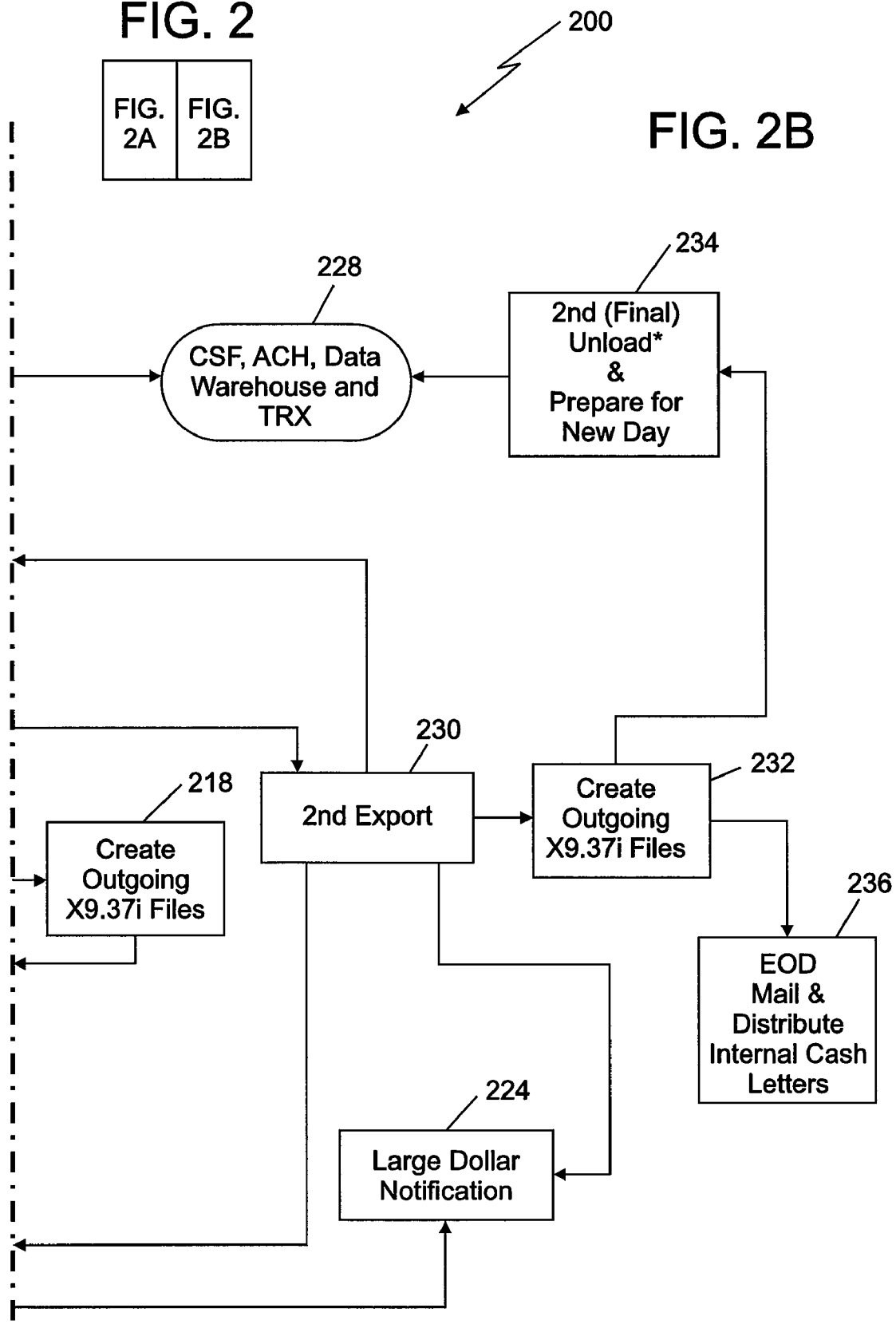

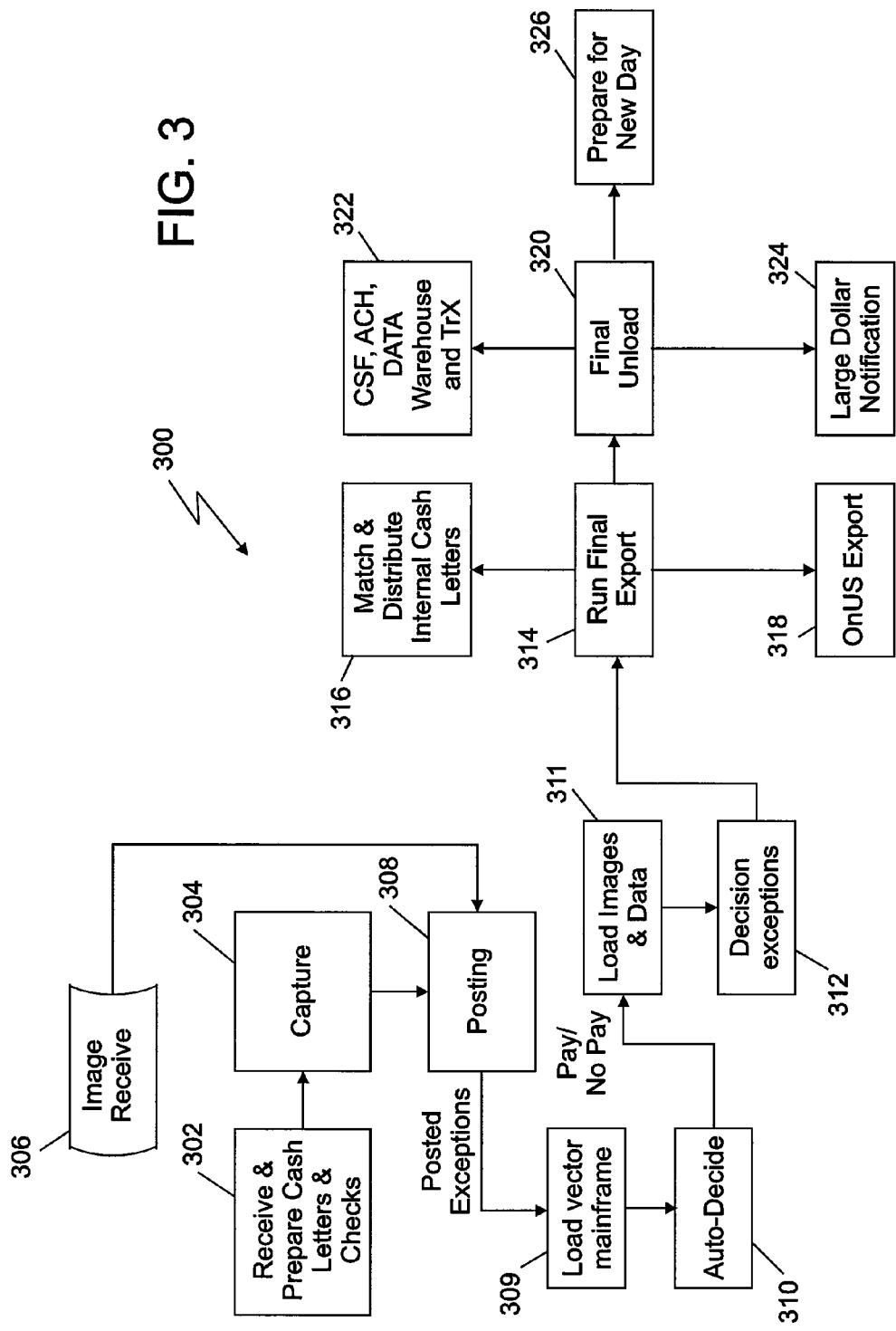

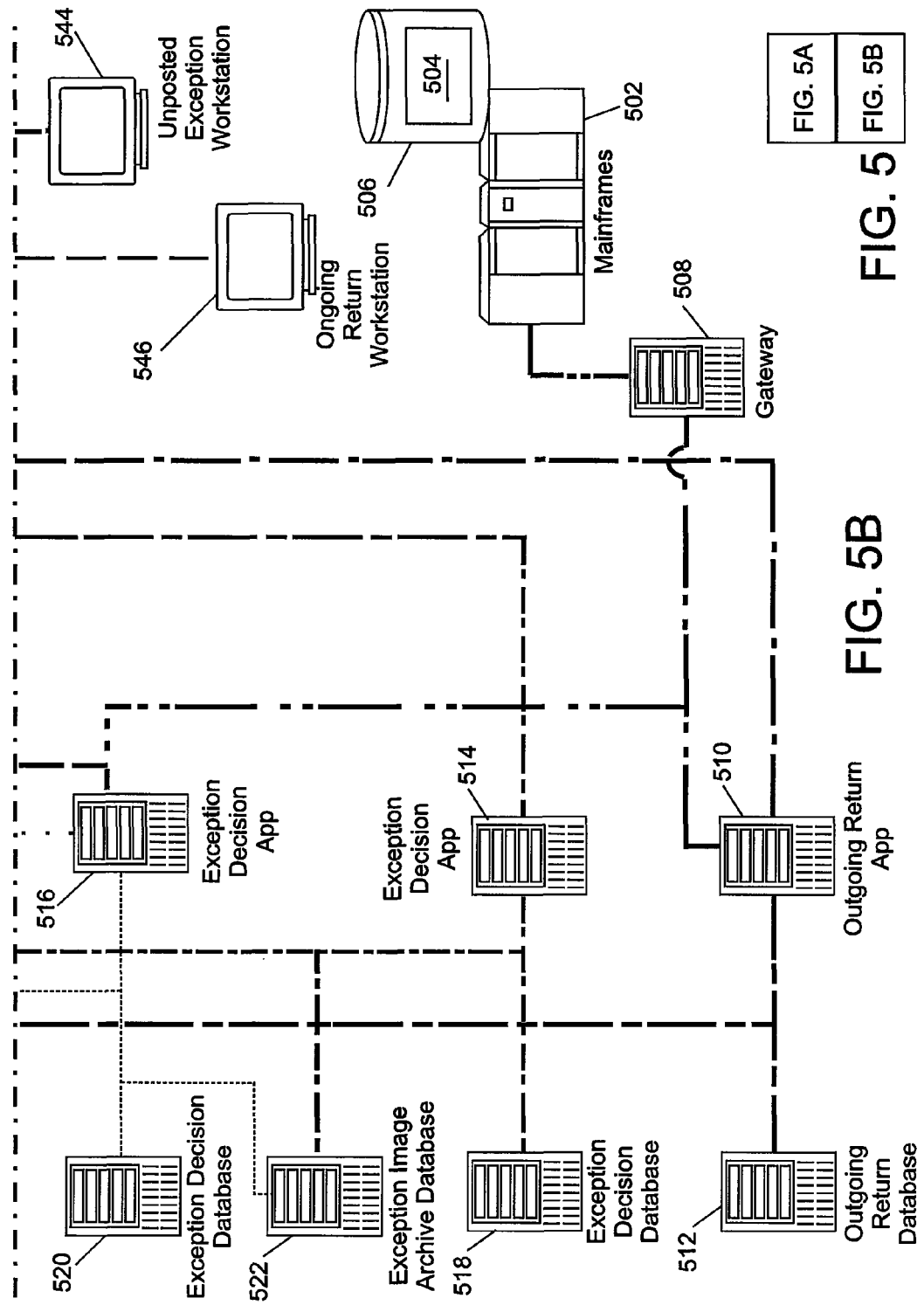

SYSTEM AND METHODS FOR HANDLING FINANCIAL DOCUMENT RETURNS AND PROCESSING EXCEPTIONS

BACKGROUND

Financial Institutions have established various processes and associations related to the exchange of documents and items evidencing monetary transactions. Some types of documents have been historically encoded with magnetic ink so that information from the documents can be read by machine. Such documents have thus become known as magnetic ink character recognition (MICR) documents. In the past, these documents have been at least theoretically presented by delivery of physical paper. However, many types of payments and transactions are no longer enabled by paper. Additionally, even with traditional checks, check presentment and clearing is no longer accomplished using the physical checks, even though paper checks may still be shipped between banks for reconciliation or error recovery, and stored and referred to for various purposes within a financial institution.

For some time, posting of financial transactions to accounts at a clearing institution has been accomplished through the use of a "cash letter" which contains detailed data on all the transactions to be cleared. At one time, cash letters were paper documents, but in the modern banking system, an "electronic cash letter" (ECL) is typically used. An ECL file can also be referred to as an "electronic cash presentment" (ECP) file. ECP files are formatted according to accepted industry standards. ECP files can be sent directly between financial institutions, but they are also often sent through clearing agents or a centralized, government based banking system, for example, the Federal Reserve System in the United States.

Handling exceptions and returns based on paper documents is subject to numerous errors as a result of paper handling and due to late delivery of documents. Legislation has authorized banks to completely do away with the use of paper for settlement and reconciliation of accounts between banks. In the United States for example, this legislation is referred to as "The Check Clearing for the 21st Century Act" or simply "Check 21" and authorizes the use of electronic records for presentment from one bank to another as long as the images in the electronic records actually represent any original paper documents. A large financial institution must present millions of items each day to clearing financial institutions for posting. If images are used, these images are typically created at numerous processing sites, in many cases, from paper documents. Additionally, information describing the documents and images must often be produced in numerous formats for different purposes, necessitating that the paper documents be kept on hand so that the information and images can be corrected and updated using the paper documents when a return or exception occurs.

SUMMARY

Embodiments of the invention provide a returns and exceptions platform to image enable check returns and exceptions operations so that those operations within a financial institution or similar enterprise can operate completely digitally, using only images and data to manage exceptions and returns without referring to paper checks at any time in any part of a financial organization. In some embodiments, this capability is in part enabled by a system that provides both for decisioning items based on images of the items, and dispatching or exporting images and data in a plurality of formats from the system into which they are first loaded, so that paper items need not be referenced again.

In at least some embodiments, a document subject to an exception is handled when images of and data for a plurality of financial documents are loaded into a document processing system. The document subject to the exception is subject to decisioning based substantially only on the image and data from the at least one document. The image and data for the document with the exception is exported, dispatched, or sent as needed in a plurality of formats at various times, subject to the decisioning to accommodate a variety to image and/or financial document processing needs and systems.

In some embodiments, the exception documents can be subjected to a large dollar notification process. An exception for purposes of this disclosure can be either an incoming return of a document, an outgoing return of a document, or what in banking parlance is traditionally known as an exception, which is a problem with an item that prevents the item information from being accounted for. The plurality of formats for export can include X9.37i files, internal and external cash letters, and image replacement documents. The decisioning undertaken can be automatic decisioning, decisioning by an operator, but with reference to images and data rather than the documents, or a combination of the types of decisioning.

In example embodiments, the image-based processes of the invention can be implemented in an image document processing system that includes a plurality of application servers for enabling decisioning of the exception documents and to provide for dispatching the images and data in a plurality of formats subject to the decisioning. A plurality of database servers can be functionally connected to the plurality of application servers for storing images and data. A network interconnects the servers. At least one operator terminal can be connected to the network to present images of exception documents to an operator for decisioning.

In a system according to example embodiments of the invention, an application server can be paired with a database server for each of incoming returns, outgoing returns, and other exceptions. Additionally, an image archive database and a customer information database can be included. The invention can be implemented via appropriate software or computer program code instructions. These instructions may be in the form of a computer program product, which is installed to run on the servers discussed above. The combination of hardware and software to perform the functions described can form the means to carry out the processes of the invention.

BRIEF DESCRIPTION OF THE DRAWINGS

FIGS. 1A and 1B are a high-level flowchart that describes the high-level process of the various embodiments of the present invention.

FIGS. 2A and 2B, 3, and 4 are flowcharts that respectively provide detail of the processes of various embodiments of the invention.

FIGS. 5A and 5B are a network block diagram that illustrates the operating environment and system of example embodiments of the invention.

DETAILED DESCRIPTION OF THE INVENTION

Figure 1A:
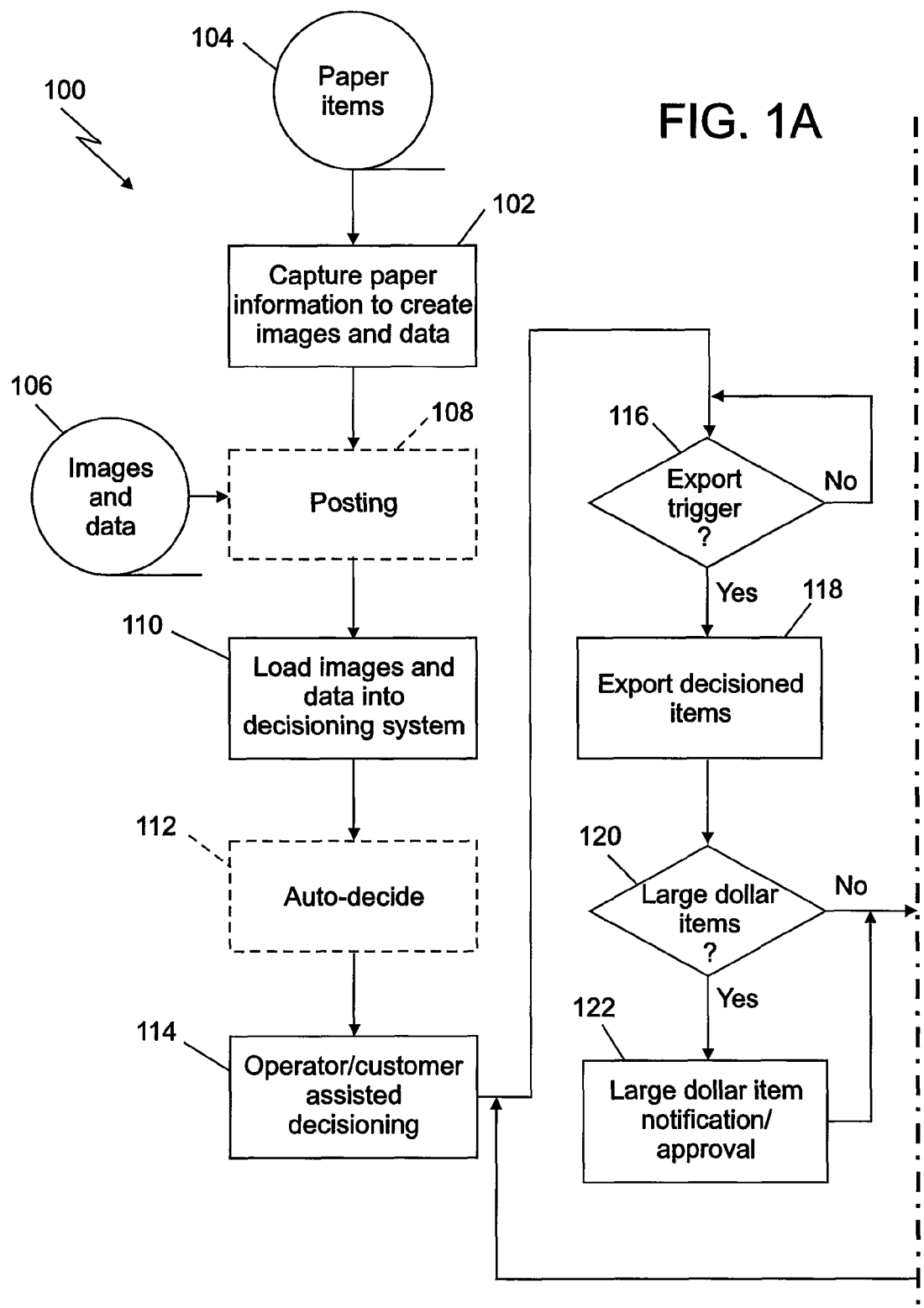

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), a digital versatile disc read-only memory (DVD-ROM) an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium including, but not limited to, the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

It will be beneficial for the reader to understand some of the terminology used herein. The methods and system described herein is designed to handle exceptions, outgoing item returns, and incoming item returns for a financial institution such as a bank. In banking parlance, returns are paper documents and/or images and/or data records of transactions that are returned unprocessed to the originating bank from the receiving bank. These returns can occur because, for example, there are unavailable funds in the account, a stop payment order is pending or the account an item is drawn in is closed. These items are returned from the drawee's bank to the originating bank because they would cause a loss if honored. Once returned, the originating bank can correct any errors or irregularities and present the items again for collection. Exceptions are any other items that cannot be paid against a customer's account by a bank. In at least some sense, returns are specific types of exceptions, thus, for purposes of this disclosure, the term "exception" can be used to identify not only what bankers typically call an exception, but also both incoming and outgoing returns.

The term "bank" and any similar terms are used herein in their broadest sense. Financial institutions that process transactions and documents of the types discussed can include stock brokerages, credit unions, and other types of institutions which are not strictly banks in the historical sense. Even retail and other service businesses, as well as manufacturers may process documents and/or data as disclosed herein. The use of terms such as bank, "institution" or "franchise" herein is meant to encompass all such possibilities.

Much of the terminology herein refers to the processing of information about MICR encoded documents. This information can be stored in a data processing system, in computer memory and/or media for retrieval and manipulation. There are many ways to design a system to accommodate the storage of this information, as well as the storage of electronic images of documents such as checks. For example, this terminology can refer to information stored in what is commonly known as a "check image management system" (CIMS) and within a "check processing control system" (CPCS). Such systems are well known within the banking industry by those who work in the financial data processing fields.

Check images and data about the checks the images represent, such as index information referring to the check images, which typically includes the MICR data, can be stored by processing systems according to any of various industry standard formats, for example, the well-known common import file format (CIFF). Such systems have been used for many years by many banks to archive check images. Images and index information in such a system can be stored in the same file or separated. In some environments, the index information is separated and stored in an electronic cash letter (ECL) for communicating between financial institutions for the purpose of settlement.

Index information can also be stored with electronic images in an "image cash letter" (ICL) to provide for the truncation of the paper documents. Again, these systems and techniques are well known by those of ordinary skill in the financial information technology arts. Note that a cash letter (CL) file can also be sent from a clearing bank to a depositary, capturing bank, or sending bank. A well-known industry standard format for a cash letter file that contains both images and all data necessary to index and understand the images is the X9.37i format, which is promulgated by the American National Standards Institute (ANSI).

As previously mentioned, embodiments of the invention provide a returns and exceptions platform to image enable check returns and exceptions operations so that those operations within a financial institution or similar enterprise can operate substantially using only images and data to manage exceptions and returns without referring to paper checks. In some embodiments, this capability is in part enabled by a system that provides both for decisioning items based on images of the items, and dispatching or exporting images and data in a plurality of formats from the system into which they are first loaded. By "substantially using only images" what is meant is that the vast majority of routine processing of exceptions (including returns) can be handled without reverting to paper documents once any incoming paper items have been captured. This terminology is not meant to suggest that paper checks might not be used for other purposes in a bank, or that paper checks might not be used occasionally in returns and exceptions processes. As will be appreciated from the discussion below, paper items, known as image replacement documents, may be used in the processes of the invention by necessity, and are considered separately from paper checks as discussed above.

FIGS. 1A and 1B are a high-level flowchart illustrating a generic process, 100, that can be used for paperless processing of exceptions in a bank according to the example embodiments of the invention. As is typical with flowchart illustrations, process 100 of FIGS. 1A and 1B are presented as a series of interrelated process blocks. At block 102, paper items, 104, are converted to images and data. This process can be referred to as "capturing" the paper items. Items that have been captured at other institutions result in images and data 106 entering the process after the capturing of paper. The rest of process 100 illustrates dealing with only exception items from feeds 104 and 106. These exception items can enter the posting process 108, or be loaded into a decisioning system at block 110, depending on whether the item is a return or some other kind of exception. An auto-decision algorithm can optionally be applied at block 112. Operator assisted decisioning of an exception is performed at block 114. In some embodiments for some types of returns, customer decisioning can also be employed at block 114. All types of decisioning are carried out in example embodiments based substantially on only the image of an exception item. Operator assisted decisioning can still be used for auto-decisioned items in order to confirm the auto-decision, or decision an item that could not be auto-decisioned with high enough confidence.

Still referring to FIGS. 1A and 1B, when an export of decisioned items is triggered at block 116, an exporting process begins at block 118. The exporting process can be triggered at regular intervals, based on time, or by any other means. If there are items that require extra review due to their amount exceeding a pre-set threshold at block 120, they are sent to a large dollar item notification and/or approval process at block 122. At block 124, a determination is made as to whether any decisioned item being exported needs to have an image replacement document (IRD) created for the item. If so, an IRD for each such item is created and printed at block 126.

An IRD is paper document created by a bank to use as a substitute for a paper check for presentment to a drawee bank. Such a document might be needed of the drawee bank is not yet image enabled. Since, as previously discussed, legislation has authorized banks to do away with the use of paper for settlement and reconciliation of accounts between banks; it is possible that a depositary bank would not keep a copy of a check for presentment. In cases where a paper document is needed, the legislation authorizes a bank to create one in the form of a "substitute check." A substitute check contains an image of the front and back of the original check, as well as a MICR line that can be read by standard MICR equipment. Since the substitute check uses a printout of a stored electronic image, it is often referred to in banking parlance as an image replacement document ("IRD"). The IRD normally carries with it the full faith and credit formerly attributed to paper checks, as long as it meets the standards specified in the legislation.

Returning to FIGS. 1A and 1B, at block 128, images and data describing the exception items are converted to or included in X9.37i files at block 128. IRD's, internal, and external cash letters, and possibly other items are dispatched in those files at block 130. At block 132, the process repeats, running in parallel with the decisioning processes, until it is time to unload the exception items from the system. In some embodiments, the unload is conducted at regular time intervals, but the unload could be conducted on any schedule desired. In either case, items are unloaded in this embodiment at block 134, and in example embodiments, files in other formats are then dispatched at block 136. These files could be dispatched, for example to the automated clearing house (ACH) system, or to an internal or external data warehouse. Finally, when the end of a business day is reached at block 138, end-of-day processing is triggered as shown at block 140.

Figure 4:
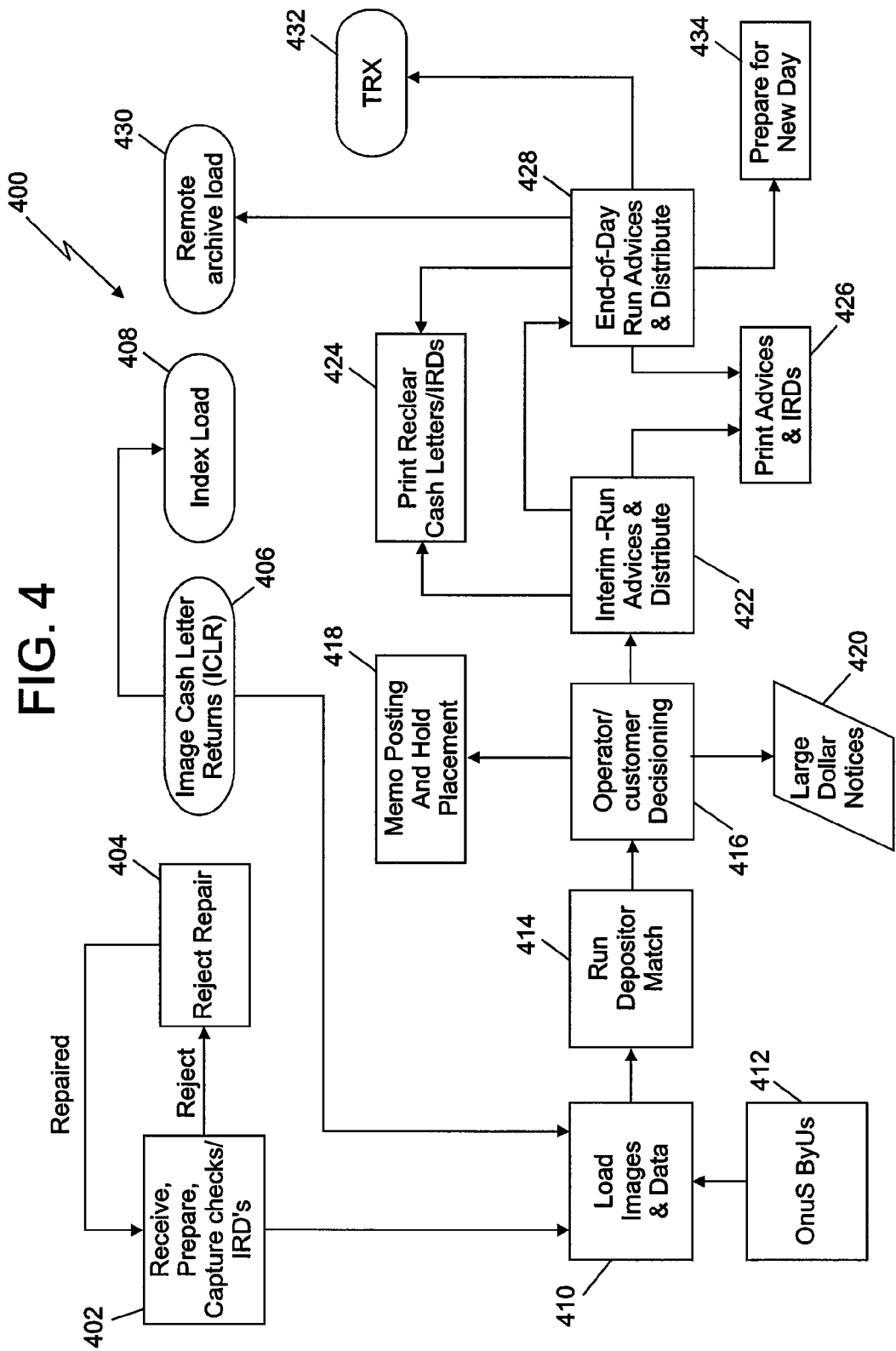

FIGS. 2, 3, and 4 are more detailed flowcharts showing how a system according to example embodiments of the invention specifically handles exceptions other than returns, outgoing returns, and incoming returns, respectively. Process 200 of FIG. 2 is the process for other exceptions. At block 202 paper cash letters and checks are received and prepared. Block 202 can include proofing and correction. For purposes of this disclosure, the functions at block 202 include receipt of both paper checks and electronic files from image enabled institutions that need to be "virtually captured." This block includes the capture paperwork from other institutions, branches and back room departments. Later in the day the captured information can be sent to a posting system. At block 204, items are brought from a proof area or a receive area to CPCS capture rooms and the items are run through high-speed capture equipment as is known in the art. The images are sent to the CIMS (and then to an archive) and the data is indexed. Information can also be sent to internal applications for posting and any other purposes. An image receive process, 206, can be used to obtain image cash letters from other institutions that can be indexed and archived immediately, and move on to the posting process.

Figure 2A:
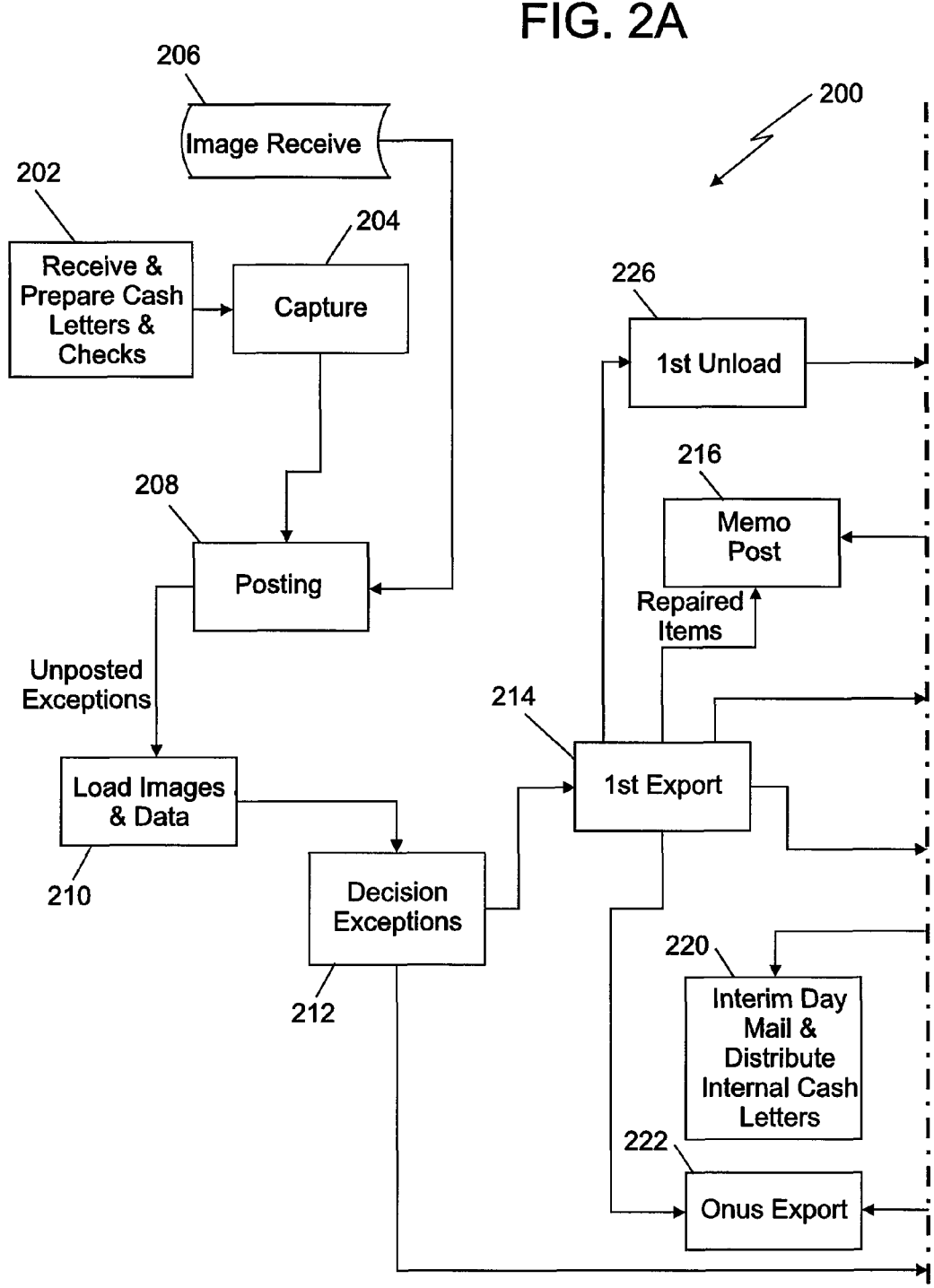

Still referring to FIGS. 2A and 2B the posting applications post items against appropriate accounts at block 208. In example embodiments, the posting takes place nightly. After the posting process is complete, files and reports of exceptions are created and stored. These files of un-posted exceptions are loaded into a decisioning system at block 210. During the loading, data is formatted by and may be stored temporarily on a large computer system such as a mainframe. Images are requested from an archive. In example embodiments, the data in the appropriate format is forwarded through a gateway to an appropriate application server, and the images and data describing the items are stored on an associated database server for decisioning. In this example, operators decision the items at block 212 based only on images and data available at operator terminals. The operators do not need to refer to paper items.

The remainder of the example process of FIG. 2 is related to exporting information that has been decisioned, and dispatching this information to the various systems that require it. At block 214, the first export of a working day occurs. This export provides for memo posting credits that have been decisioned at block 216. Outgoing X9.37i files are created at block 218 and can be forwarded. These files are used to create and distribute internal cash letters at block 220, and to further export "on us" items to appropriate shared systems at block 222. Files may also be sent to the Federal Reserve Bank or other national bank or clearinghouses for clearing and to a large dollar notification process, 224. Files can also be used to print IRD's as needed. In example embodiments, the large dollar notification process involves asking an operator or manager for approval of items for dollar amounts that exceed a pre-set threshold. This process, for example, can include presenting a query to an approver via a world wide web application.

Still referring to FIGS. 2A and 2B, files decisioned to this point are unloaded from the decisioning system at block 226, and data is finally sent to mainframe applications at block 228 such as a customer statement formatter (CSF), the previously mentioned ACH, a data warehouse, and a transaction accounting system (referred to herein as the "TRX"). Images and data are ultimately dispatched both internally and externally by a mainframe system in all of the appropriate formats for the various systems. In this example embodiment, a second export is carried out prior to the end of a working day at block 230 and outgoing X9.37i files are again created and used at block 232 for on us export, large dollar notification, and memo posting in the same manner as previously discussed with respect to block 218. A second and final unload of the working day takes place at block 234, and an end-of-day (EOD) distribution of internal cash letters takes place at block 236. All internal cash letters and IRD's for the business day can be created as part of this end-of-day processing.

FIG. 3 is a more detailed flowchart of an outgoing returns process, 300, according to example embodiments of the invention. At block 302 paper cash letters and checks are received and prepared. Block 302 can include proofing and correction. For purposes of this disclosure, the functions at block 302 include receipt of both paper checks and electronic files from image enabled institutions that need to be "virtually captured." This block includes the capture paperwork from other institutions, branches and back room departments. Later in the day the captured information can be sent to a posting system. At block 304, items are brought from a proof area or a receive area to CPCS capture rooms and the items are run through high-speed capture equipment as is known in the art. The images are sent to the CIMS (and then to an archive) and the data is indexed. Information can also be sent to internal applications for posting and any other purposes. An image receive process, 306, can be used to obtain image cash letters from other institutions that can be indexed and archived immediately, and move on to the posting process.

Still referring to FIG. 3 the posting applications post items against appropriate accounts at block 308. In example embodiments, the posting takes place nightly. After the posting process is complete, files and reports of exceptions are created and stored. In the case of outgoing returns, these files indicate posted exceptions. These items are loaded into a decisioning system for auto-decisioning at block 309. Data is put in an appropriate format for auto-decisioning, which in the example embodiment, takes place on a vector processor based mainframe. In example embodiments, for outgoing returns, branch managers for the financial enterprise can access the images on the mainframe and also decision them (not shown) prior to auto-decisioning. At block 310, the images on the mainframe computer system are auto-decisioned to make a pay/no-pay for each outgoing return item. These files of posted exceptions are loaded into the server-based decisioning system at block 311. During the loading, data is formatted by and may be stored temporarily on the mainframe computer system. Records from the previous decisioning are also stored in the decisioning servers. Images are requested from the archive. In example embodiments, the data in the appropriate format is forwarded through a gateway to an appropriate application server, and the images and data describing them are stored on an associated database server for decisioning. In this example, operators decision the items at block 312 based only on images and data available at operator terminals. The operators do not need to refer to paper items. However, in this case, operators can ratify the previous decision if that is the appropriate course of action for a particular item.

The auto-decisioning mentioned above can be accomplished in a number of different ways. In at least one embodiment, the posting system can determine whether certain problems exist that would prevent an item from being paid, for example, whether the relevant account has been closed. The posting system can then store an indication of the problem for each such item in the form of an exception code. At block 310 of FIG. 3, any exception codes recorded in this way can be looked up in a stored table that lists a disposition for each such exception code.

The remainder of the outgoing return handling process 300 of FIG. 3 includes running an export process at block 314, which produces files for outgoing return items that have been decisioned. Credits are memo posted (not shown) in a fashion similar to that previously discussed. Exported files are used to dispatch internal cash letters as shown at block 316. Items are matched up to advices in the cash letters and IRD's are printed as necessary. Files from export 314 are also used for "on us" export process 318. The "on us" export process creates files of items that are drawn on the financial institution implementing the embodiment of the invention, and these files are sent to appropriate systems in the enterprise in the appropriate format for handling.

Still referring to FIG. 3, files unloaded from the decisioning system at block 320, containing images and data are finally sent to mainframe applications at block 322 such as a customer statement formatter (CSF), the previously mentioned ACH, a data warehouse, and a transaction accounting system (TRX). Images and data are ultimately dispatched both internally and externally by the mainframe system in all of the appropriate formats for the various systems. Large dollar notification is again provided at block 324, and works in the manner previously described. Finally, at block 326, preparation for a new day takes place. The servers used for decisioning and return processing are cleared of all data from the current business day and images are short-term archived. In example embodiments, the images are retained for five days. This archiving is provided to support the returns and exceptions decisioning process, and is independent of the typical long-term archive maintained by most financial institutions for legal and exchange purposes.

FIG. 4 is a flowchart showing the process for image-based handling of incoming returns. Process 400 begins at block 402 where cash letters, checks, and in this case, IRD's from other institutions are received and prepared for capture. When paper return cash letters are received, they may be proofed prior to being sent to a capture area for capture by a CPCS system. Images are stored in CIMS. The CPCS system creates an interface file and an image file and forwards these files to the servers handling image returns. This process typically makes use of a large computer system such as a vector processor based mainframe system. Items that cannot be captured are run through reject repair process 404 and captured once repaired. It should be noted that either a paper-based reject repair process or an image-based reject repair process can be used for reject repair at block 404 without departing from the spirit and scope of the present invention. An image-based reject repair process is disclosed in published U.S. Patent Application 2005/0139671, which is incorporated herein by reference.

Still referring to FIG. 4, image cash letter returns 406 are image-based return exchange files from other institutions. In addition to being loaded into the decisioning systems as described below, these files are used to load an enterprise-wide indexing system at block 408. In this process, endorsement records by the bank of first deposit are stripped from the files and stored as images together with the rest of the information and images from the front of the checks. At block 410 files of return items are loaded into a decisioning system. During the loading, data is formatted by and may be stored temporarily on a large computer system such as a mainframe. Images are requested from the archive. In example embodiments, the data in the appropriate format is forwarded through a gateway to an appropriate application server, and the images and data describing them are stored on an associated database server for decisioning. At block 412, "on us, by us" items that have been created by the outgoing return decisioning process are also forwarded for loading into the incoming return decisioning systems at block 410. This process can be handled by appropriate scripts running on the servers and accounts for items for which the financial institution implementing this embodiment of the invention is the bank of first deposit.

In the embodiment of FIG. 4, the first part of the decisioning of the incoming return exception items is a depositor match as shown at block 414. With the files loaded onto the appropriate servers the work will wait for an operator to accept the work and submit deposit matching decisions, based only on images and data stored in the system. The depositor matching process takes items that came in from the image receive process or the paper capture process and determines the actions required to handle the items. This process may include looking the items up in an all items database to determine an offset (credit side of the transaction). Once the offset is determined the system can access a customer information file database, which in at least some embodiments includes advice types, product codes, payment types and the like for customer accounts. Depositor matching process 414 can also look up the needed information in the incoming returns database maintained at the incoming returns database server to determine if an account is associated with any special instructions for processing an item.

Still referring to FIG. 4, image-based operator decisioning takes place at block 416. Decisioning at block 416 works as before, except that in the case of incoming returns, provision can be made for remote decisioning by on-line banking customers. The incoming returns application server can be interfaced with an on-line banking system through a customer decisioning server. The customer is greeted with a message on the next logon and asked about the item, and can provide information to aid in the decisioning or decision the item. Decisioning at block 416 results in a memo posting and hold placement process as shown at block 418. The process at block 418 in example embodiments is a batch process whereby holds are placed on chargeback items and any early notification items. Holds can also be placed on the return accounts. In example embodiments, records are forwarded to the mainframe system to record hold and/or memo post transactions against the affected accounts. The decisioning at block 416 can also result in large dollar notices at block 420, which are created for early notification of returns. These notices are made available for on-line review by appropriate personnel. These notices will be generated as part of the end-of-day process as well. Items can also be printed on paper as a result of these notices for forwarding to customers via mail if needed.

At block 422 of FIG. 4, advices are produced and distributed for items being processed. The incoming returns application server produces advices for all the items for which it has all the appropriate information. This process will generate output files in the appropriate formats to be displayed to management or other users, for IRD's to be printed, and for outgoing image return files for other institutions. For non-image enabled institutions, re-clear cash letters are printed at block 424. IRD's and paper advices needed for such purposes are printed at block 426. If a customer has left special instructions at the decisioning point to mail, e-mail, or fax an item to the customer the system will create the appropriate media and/or file and send it to the correct server as part of these processes. These processes are repeated in this example embodiment near the end of the day at block 428, except that in this case, images are archived in a remote archive system at block 430, transactions are finally posted to the TRX at block 432, and end-of-day processing as previously described, including the resetting of any processing flags, occurs at block 434. For loading the remote archive, a CIFF file will be sent to the remote archive system so that images can be loaded to the returns folders.

Figure 5A:
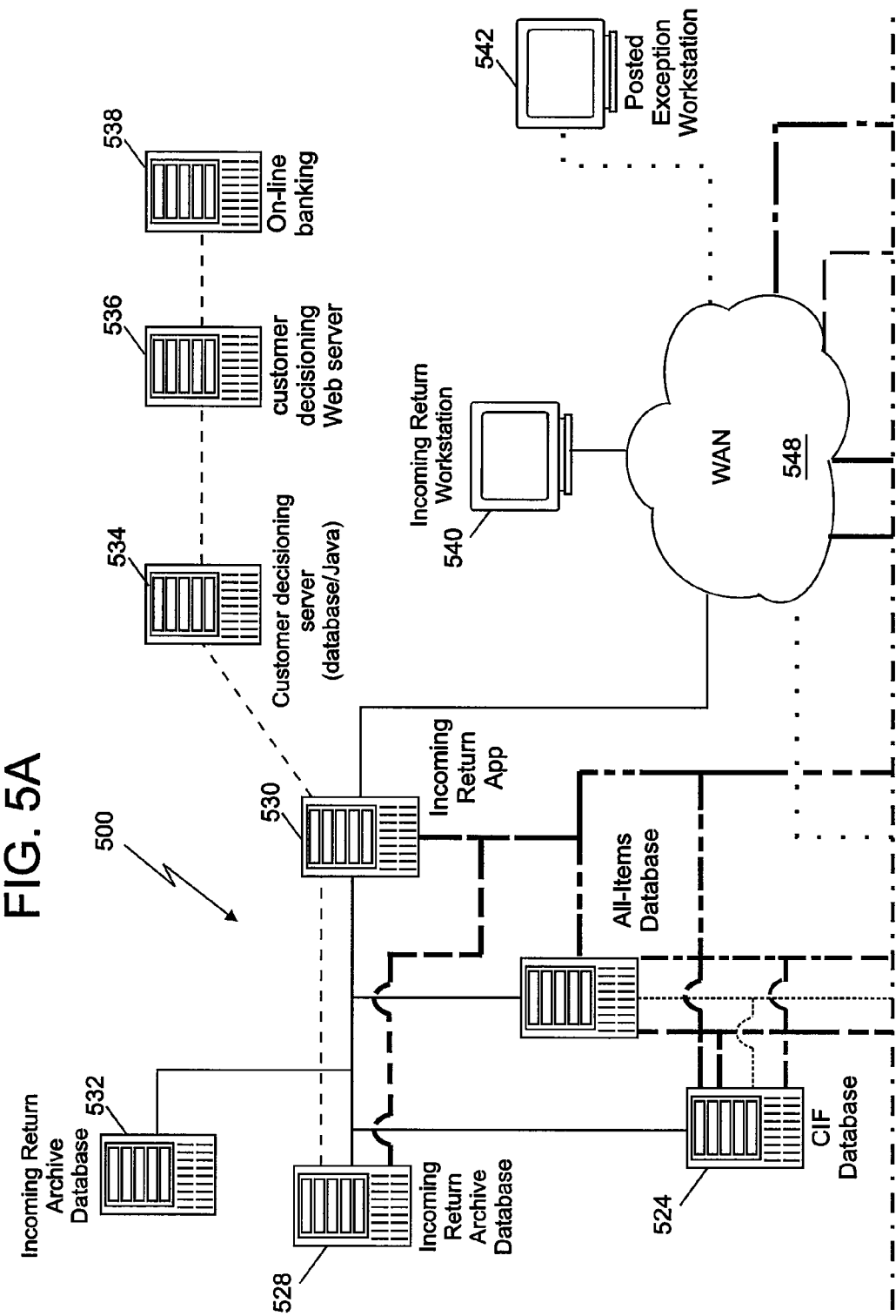

FIGS. 5A and 5B are a network and system block diagram illustrating the operating environment, apparatus, and system used in carrying out example embodiments of the invention. System 500 of FIGS. 5A and 5B include mainframe computer system 502 that can be used for batch processing and at least some of the decisioning described herein. In this example embodiment, portions 504 of the applications reside on the mainframe storage media 506. Portions of the applications used can also reside on media included with the application servers described below and can be transported for use on removable media or over a network, however for clarity, only the media and application portions residing on the mainframe system are pictured in FIGS. 5A and 5B. Gateway 508 is used to move files to and from appropriate servers from mainframe system 502.

Server systems 510, 512, 514, 516, 518, and 520 of FIG. 5 in this example embodiment are set up using software that is well-known. Outgoing return application server 510 is used to decision outgoing items. Files received from throughout the franchise of a typical financial institution can be decisioned here for inclusion in image return cash letters. Outgoing returns database server 512 contains information for operators to decision items while decisioning is being carried out. Two exception decision systems are included in this example embodiment. The number of any of the servers and systems discussed herein is subject to normal engineering decisions based on the volume of work to be handled. Exception decision application servers 514 and 516 are paired with exception decision database servers 518 and 520, respectively. These systems are used to decision items considered exceptions, such as funds not being available. An exception image archive database system, 522 is also included.

Still referring to FIGS. 5A and 5B, customer information file (CIF) database server 524 houses customer information that may be needed by the image-based returns and exceptions processes described herein. In example embodiments, this database is refreshed with the latest information from other standard customer databases at regular intervals. All items database server 526 houses all the capture data for the financial institution for reference by the image-based processes described herein. This server can be populated from image files and data received from other institutions as well as from CPCS systems throughout the enterprise.

Server systems 528, 530, and 532 of FIG. 5 in this example embodiment are set up using software that is well-known as previously mentioned. Incoming returns application server 528 houses the application software used during daily decisioning for inbound returns. Database server 530 houses the files that are used in the daily inbound return decisioning, including image and data files that can be sent on a daily basis. Incoming return archive database server 532 can be used to house images that were processed over some period of time in the past in case the images need to be referred to again. In example embodiments, images are housed at this database server for 180 days.

Still referring to FIG. 5, customer decisioning server 534 in this example embodiment houses Java based application(s) that interface web server 534 with the incoming return processing systems to provide for customer decisioning. A database for temporarily storing items that are in the customer decisioning process is also provided. The applications and database for customer decisioning could be housed on separate servers. Web server 534 is further connected to on-line banking systems 538, which can be implemented as is known in the art. Workstations 540, 542, 544, and 546 are used for operator assisted decisioning. Workstation 540 is used for incoming returns, workstation 542 is used for posted exceptions, workstation 544 is used for unposted exceptions, and workstation 546 is used for outgoing returns. These workstations are interfaced to the previously described systems through wide area network (WAN) 548. Other WAN and/or local area network (LAN) (not shown) can be used to provide connectivity of all of the servers and machines pictured in FIG. 5. System 500 includes other elements that have been omitted for clarity, such as a facsimile server and e-mail server for use in communicating various events, advices, decisions, etc. to appropriate parties. Connecting lines of various distinguishable types are shown in FIG. 5 to indicate some of the functional interactions between the various servers and platforms in line with the descriptions of the processes of embodiments of the invention described herein.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions described herein may occur on an order different than the order presented. It should also be noted that functions and combination of functions described herein can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of handling at least one document from a plurality of financial documents, the at least one document subject to an exception, the method comprising:

receiving one or more actual images of the at least one document and data corresponding to information associated with the at least one document, wherein the plurality of financial documents are exceptions for incoming return documents, outgoing return documents, or other exception documents;

loading the one or more actual images of the at least one document and the data corresponding to information associated with the at least one document, into a document processing system for decisioning;

decisioning an exception code for the one or more actual images of the at least one document and the data corresponding to information associated with the at least one document with reference to substantially only the one or more actual images of the at least one document and data corresponding to information associated with the at least one document without having to reference an original paper document corresponding to the at least one document after the one or more actual images of the at least one document are captured from the original paper document corresponding to the at least one document, wherein the exception code is useable to determine the disposition of the one or more actual images of the at least one document and the data corresponding to information associated with the at least one document in the document processing system; and dispatching the one or more actual images of the at least one document and the data corresponding to information with the at least one document in one of a plurality of formats subject to the exception code.

2. The method of claim 1 further comprising recording a notification of the at least one document being subject to a large dollar notification, wherein the at least one document is subject to the large dollar notification if an amount of the at least one document exceeds a pre-set threshold, and wherein an operator is made aware of the notification for approval of processing the document.

3. The method of claim 1 wherein the plurality of formats comprises at least one of an internal cash letter, an X9.37i file, an external cash letter, and an image replacement document (IRD).

4. The method of claim 1 further comprising applying a magnetic ink character recognition (MICR) image correction to an incoming return.

5. The method of claim 2 wherein the plurality of formats comprises at least one of an internal cash letter, an X9.37i file, an external cash letter, and an image replacement document (IRD).

6. The method of claim 1 wherein decisioning the exception code for the at least one document comprises:
   automatically decisioning the exception code for the at least one document based on the data.

7. The method of claim 1 wherein decisioning the exception code for the at least one document comprises obtaining information from a customer to aid in the decision.

8. A computer program product comprising a medium including computer program instructions for performing the method of claim 1.

9. A computer program product comprising a medium including computer program instructions for performing the method of claim 3.

10. A computer program product comprising a medium including computer program instructions for performing the method of claim 6.

11. A computer program product comprising a medium including computer program instructions for performing the method of claim 7.

12. Apparatus for handling exception documents from a plurality of financial documents, the apparatus comprising:
   means for receiving one or more actual images of the at least one document and data corresponding to information associated with the at least one document, wherein the plurality of financial documents are exceptions for incoming return documents, outgoing return documents, or other exception documents;
   means for loading the one or more actual images of the at least one document and the data corresponding to information associated with the at least one document, into a document processing system for decisioning;
   means for decisioning an exception code for the one or more actual images of the at least one document and the data corresponding to information associated with the at least one document with reference to substantially only the one or more actual images of the at least one document and data corresponding to information associated with the at least one document without having to reference an original paper document corresponding to the at least one document after the one or more actual images of the at least one document are captured from the original paper document corresponding to the at least one document, wherein the exception code is useable to determine the disposition of the one or more actual images of the at least one document and the data corresponding to information associated with the at least one document in the document processing system; and
   means for dispatching the one or more actual images of the at least one document and the data corresponding to information with the at least one document in one of a plurality of formats subject to the exception code.

13. The apparatus of claim 12 further comprising means for recording a notification of the at least one document being subject to a large dollar notification, wherein the at least one document is subject to the large dollar notification if an amount of the at least one document exceeds a pre-set threshold, and wherein an operator is made aware of the notification for approval of processing the document.

14. The apparatus of claim 12 wherein the plurality of formats comprises at least one of an internal cash letter, an X9.37i file, an external cash letter, and an image replacement document (IRD).

15. The apparatus of claim 13 wherein the plurality of formats comprises at least one of an internal cash letter, an X9.37i file, an external cash letter, and an image replacement document (IRD).

16. The apparatus of claim 12 further comprising means for applying a magnetic ink character recognition (MICR) image correction to an incoming return.

17. The apparatus of claim 13 further comprising means for applying a magnetic ink character recognition (MICR) image correction to an incoming return.

18. The apparatus of claim 14 further comprising means for applying a magnetic ink character recognition (MICR) image correction to an incoming return.

19. The apparatus of claim 12; wherein the means for decisioning the exception code for some of the exception documents comprises a means for automatically decisioning the exception code for some of the exceptions based on the data.

20. The apparatus of claim 14; wherein the means for decisioning an exception code for some of the exception documents comprises a means for obtaining information from a customer to aid in the decision.

21. A system for handling at least one document from a plurality of financial documents, the at least one document subject to an exception, the system comprising:
   an image receiving device configured to receive one or more actual images of the at least one document and data corresponding to information associated with the at least one document, wherein the plurality of financial documents are exceptions for incoming return documents, outgoing return documents, or other exception documents;
   a computer processing device configured to load the one or more actual images of the at least one document and the data corresponding to information associated with the at least one document, into a document processing system for decisioning;
   a plurality of application servers configured to:
      enable decisioning of an exception code for the one or more actual images of the at least one document and the data corresponding to information associated with the at least one document with reference to substantially only the one or more actual images of the at least one document and data corresponding to information associated with the at least one document without having to reference an original paper document corresponding to the at least one document after the one or more actual images of the at least one document are captured from the original paper document corresponding to the at least one document, wherein the exception code is useable to determine the disposition of the one or more actual images of the at least one document and the data corresponding to information associated with the at least one document in the document processing system;

provide for dispatching the one or more actual images of the at least one document and the data corresponding to information with the at least one document in one of a plurality of formats subject to the exception code;

a plurality of database servers functionally connected to the plurality of application servers for storing the one or more images of the at least one document and data corresponding to information associated with the at least one document;

a network interconnecting the plurality of application servers and database servers; and at least one operator terminal to present the one or more images of the at least one document to an operator for decisioning, the at least one operator terminal connected to the network.

22. The system of claim 21 further comprising:

at least one image archive database connected to the network for storing images of at least some of the plurality of financial documents; and a customer information database connected to the network.

23. The system of claim 21; wherein some of the exception documents are decisioned automatically.

24. The system of claim 22; wherein some of the exception documents are decisioned by obtaining information from a customer to aid in the decision.

25. The method of claim 7, wherein obtaining the information from a customer to aid in the decision comprises receiving the information through an online banking system.

26. The apparatus of claim 20, wherein the means for obtaining information from a customer to aid in the decision comprises a means for receiving the information through an online banking system.

27. The apparatus of claim 24, wherein obtaining information from the customer to aid in the decision comprises receiving the information through an online banking system.

* * * * *